United States Patent [19]
Welsch et al.

[11] Patent Number: 5,268,923
[45] Date of Patent: Dec. 7, 1993

[54] MIRROR MOUNT FOR LASERS

[75] Inventors: Wolfgang Welsch, Baldham; Hans Krueger, Munich; Klemens Huener, Ottobrunn; Guenter Kellerer, Taufkirchen; Rudolf Haeusler; Joerg Moehnle, both of Munich; Peter Geschka, Brunnthal, all of Fed. Rep. of Germany

[73] Assignee: Siemens Aktiengesellschaft, Munich, Fed. Rep. of Germany

[21] Appl. No.: 929,132

[22] Filed: Aug. 13, 1992

[30] Foreign Application Priority Data

Aug. 29, 1991 [DE] Fed. Rep. of Germany ....... 4128776

[51] Int. Cl.$^5$ ................................................ H01S 3/08
[52] U.S. Cl. ..................................... 372/107; 372/61; 372/65
[58] Field of Search .......................... 372/107, 61, 65

[56] References Cited

U.S. PATENT DOCUMENTS

| 4,233,568 | 11/1980 | Hamerdinger et al. | 372/107 |
| 4,893,314 | 1/1990 | Shull et al. | 372/107 |
| 5,048,046 | 9/1991 | Welsh et al. | 372/61 |
| 5,054,032 | 10/1991 | Krueger et al. | 372/107 |

FOREIGN PATENT DOCUMENTS

| 0400352 | 12/1990 | European Pat. Off. | |
| 0456875 | 11/1991 | European Pat. Off. | 372/107 |
| 0477421 | 4/1992 | European Pat. Off. | |

Primary Examiner—Georgia Y. Epps
Attorney, Agent, or Firm—Hill, Steadman & Simpson

[57] ABSTRACT

A mirror mount for a resonator mirror of a gas laser which is cost-beneficial and simple to manufacture is composed of a tube of easily-workable material, for example steel, and a mirror receptacle that has a coefficient of thermal expansion matched to that of the mirror being supported in the receptacle. The mirror receptacle has a holding region that embraces the resonator mirror and has a spacer region that defines the minimum distance of the mirror from the end of the tube, whereby the mirror receptacle is deformable in a radial direction so that stresses caused by temperature fluctuations will not produce any damage to the mirror.

19 Claims, 2 Drawing Sheets

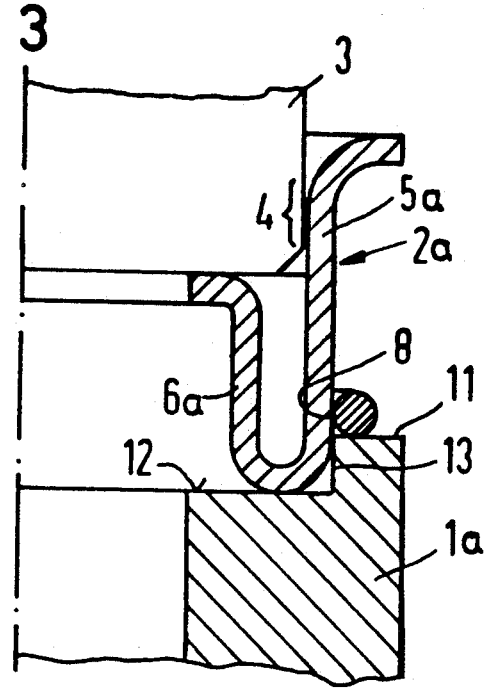
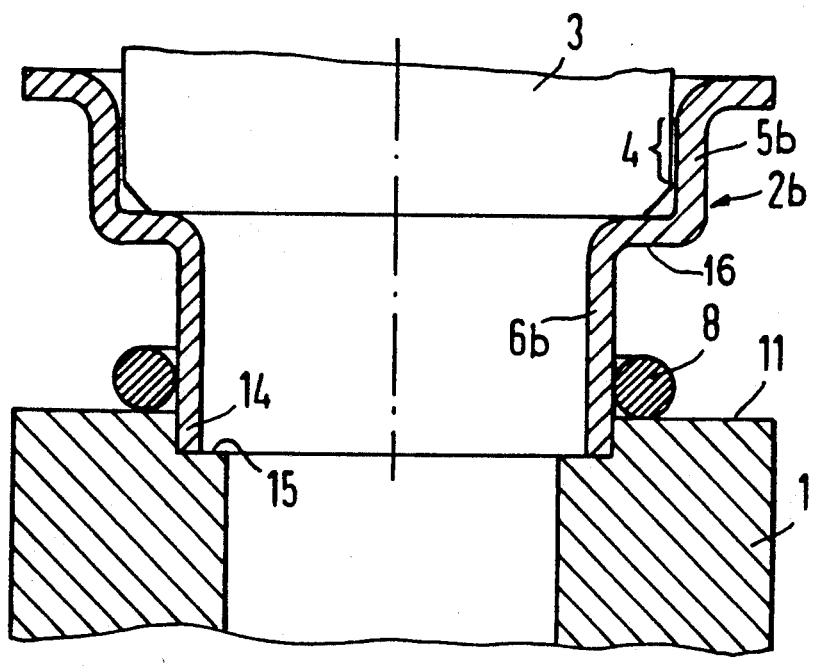

MIRROR MOUNT FOR LASERS

BACKGROUND OF THE INVENTION

The present invention is directed to a mirror mount for a gas laser, particularly a HeNe gas laser. The mirror mount contains a mirror receptacle, which is composed of a material having a coefficient of thermal expansion matched to that of the resonator mirror, and the mirror receptacle at least partially embraces a resonator mirror and is attached to a tube having a coefficient of thermal expansion differing from that of the mirror receptacle so that the mirror is in axial alignment with the tube.

U.S. Pat. No. 5,054,032, whose disclosure is incorporated herein by reference thereto and which claims priority from German Application 39 17 744, discloses a mirror mount with two parts. The U.S. Patent discloses a cylindrical mirror mount, which is manufactured of steel and another part surrounding the mirror, which is manufactured of a material having a coefficient of thermal expansion matched to that of the mirror. The material of the part surrounding the mirror, however, is difficult to process by machining and, thus, requires a long processing time. Also, disturbing burrs will occur during the machining or processing steps.

It has already been proposed elsewhere to fabricate the mirror mount of a steel tubing, introduce the mirror into an end region of a co-enlarged inside diameter of the steel tubing and to solder it with glass solder at the circumference. This embodiment requires a relatively complicated annular part, since the glass solder must be prevented from running so that a brake for the flow of the glass solder in the form of a diameter step and an uncut portion must be provided. This means considerable cost during manufacture.

SUMMARY OF THE INVENTION

The object of the present invention is to provide a mirror mount for a gas laser, which mirror mount contains a mirror receptacle composed of material having a coefficient of thermal expansion matched to that of the resonator mirror, the mirror receptacle at least partially embracing the resonator mirror and being mounted on a tube having a coefficient of thermal expansion differing from that of the mirror receptacle, with the mirror being axially aligned with the tube, which mirror mount can be manufactured in a simple manner.

This object is achieved by improvements in a mirror mount for a gas laser, particularly a HeNe laser, said mirror mount containing a mirror receptacle composed of material having a coefficient of thermal expansion matched to the coefficient of thermal expansion of the resonator mirror, the mirror receptacle at least partially embracing the resonator mirror, said mirror receptacle being joined to a tube having a coefficient of thermal expansion differing from that of the mirror receptacle to place the mirror in axial alignment with the tube. The improvements are the mirror receptacle having a holding region for embracing the mirror and a spacer region, said spacer region defining a distance of the mirror from the tube, the mirror receptacle being deformable in a radial direction so that mechanical stresses that occur between the tube and the mirror receptacle, as a consequence of temperature fluctuations occurring during both manufacturing and during operation of the laser, will not produce any damage to the mirror or to the connection between the mirror and mirror receptacle.

The mirror receptacle of the present invention can be manufactured by stamping or punching and include a deep drawing step. Thus, the manufacturing steps avoid any hollowing-out of the region for the mirror by a machining process.

An embodiment is advantageous wherein the mirror receptacle is composed of a sheet metal ring in which the retaining portion is fashioned as an outer flange ring and the spacer region is fashioned as an inner flange ring and wherein both flange rings are joined to the tubing mechanically firmly and vacuum-tight at a distance from the point of contact with the mirror. The tubing, therefore, advantageously has a higher coefficient of thermal expansion than the mirror receptacle and has an edge or end region overlapping the mirror receptacle in an axial direction so that the mirror receptacle presses against this end region. The distance between the outermost contact location between the tubing and the mirror measured along the mirror receptacle should not fall below a value of 0.5 mm given a wall thickness of 0.3 mm in the holding region. It is thereby advantageous when the tubing and the mirror receptacle are joined to one another with a surface soldering. An embrittled zone is thereby avoided and the extremely short distance between the end of the tube and the mirror will remain elastic.

Advantageously, the holding region of the mirror receptacle covers the spacer region in a radial direction. As a result thereof, an extremely short mirror receptacle occurs. A mirror receptacle that is simple to manufacture is established in that the spacer region and the holding region adjoin one another in an axial direction. Another advantageous embodiment is established in that the distance between the end of the tubing and the mirror amounts to approximately 1.3 mm and in that the end region of the tubing is soldered to the holding region of the mirror proceeding from the outside.

Advantageously, the tubing is composed of steel and the mirror receptacle is composed of a nickel/iron alloy having a coefficient of thermal expansion adapted to that of the mirror. An example of such an iron-nickel ally is commercially available under the tradename VACOVIT.

Other advantages and features of the invention will be readily apparent from the following description of the preferred embodiments, the drawings and claims.

BRIEF DESCRIPTION OF THE DRAWINGS

FIG. 3 is a partial cross sectional view of a second embodiment of the mirror mount; and FIG. 4 is an enlarged partial cross section of a third embodiment of the mirror mount in accordance with the present invention.

DESCRIPTION OF THE PREFERRED EMBODIMENTS

Figure 1:
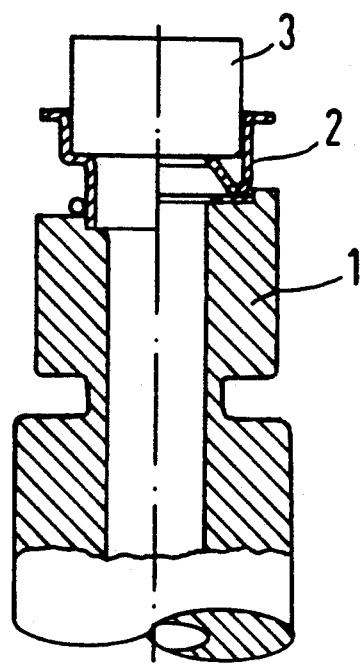
FIG. 1 is a cross sectional view of a mirror mounted in accordance with the present invention.

The principles of the present invention are particularly useful in a mirror mount illustrated in FIG. 1. As illustrated, a tube 1 of a mirror mount carries a mirror receptacle 2 that holds and centers the resonator mirror 3. The mirror receptacle 2 is constructed of a thin-wall material wherein the coefficient of thermal expansion of the mirror receptacle is adapted to that of the resonator mirror 3.

Figure 2:
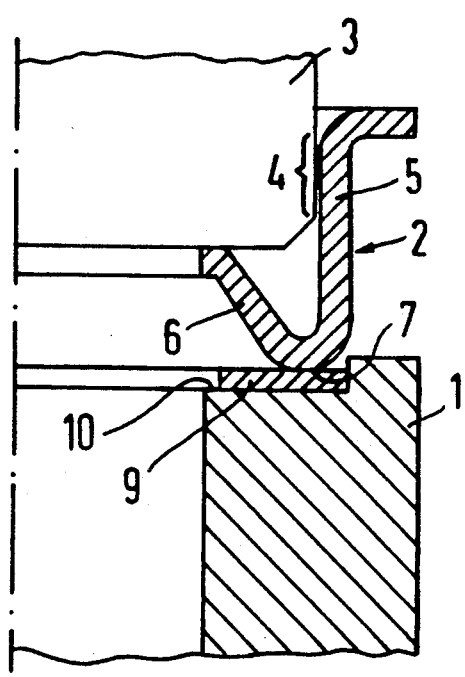
FIG. 2 is an enlarged partial cross sectional view of one embodiment of the mirror mount.

As illustrated in FIG. 2, the mirror receptacle 2 has a holding region 4 pressing against an outer circumference of the mirror 3, and this holding region 4 is joined to the mirror 3 thereat with a material bond. The holding region 4 lies on a flange ring 5 that is joined at one end to a spacer region 6 by a reversed bend 7. The flange ring 5 is soldered to the tube 1 at the bend 7, which forms a solder location 7. As illustrated, the spacer 6 is also a flange ring that extends radially inward from the ring 5.

According to the embodiment of FIG. 2, a solder ring 9 is introduced into a recess 10, which is on the end face of the tube 1. The ring 9 is melted in a surface soldering and produces a soldered connection between the tube 1 and the mirror receptacle 2. The spacer 6 presses against the mirror 3 and defines the minimum spacing of the mirror from the end of the tube 1. Given the arrangement of FIG. 2, the wall thickness is at most 0.3 mm for the mirror receptacle, and the minimum spacing between the mirror 3 and the tube end lies at approximately 0.5 mm. Here, the recess 10 only serves the purpose of accepting the solder ring 9, and its depth, therefore, lies on the order of magnitude of the wall thickness of the solder ring 9.

In the embodiment illustrated in FIG. 3, the tube 1a has a deeper recess 12 on its end face 11. The mirror receptacle 2a is axially centered by a step 13 formed by the recess 12 in the end face 11 of the tube 1a. A solder ring 8 enables soldering to proceed from the outside. The distance in an axial direction between the end face 11 of the tube 1a and the mirror 3 amounts to at least 1.3 mm in this example in order to keep an adequate part of the flange ring 5, at least the region 4, elastic despite embrittlement in the region of the solder location. As illustrated, the spacer 6a has a portion parallel to the flange ring 5 and is concentrically arranged therein.

The embodiment of FIG. 4 shows a mirror receptacle 2b that is especially simple to manufacture, wherein the flange ring 5b and the spacer 6b extend in the same direction and are interconnected by a radial shoulder portion 16. The mirror 3 will lie on the shoulder portion 16 as it is held by the holder region 4 of the flange ring 5. The shoulder 16 is a radial step and its distance from an end region 14 is determined by the axial length of the spacer 6b. The end region 14 of the spacer 6b is received in a recess 15, which is formed at an end face 11 of the tube 1b. This recess 15 will center the end region 14, which is soldered to the end face 11 by a solder ring 8.

Although various minor modifications may be suggested by those versed in the art, it should be understood that we wish to embody within the scope of the patent granted hereon all such modifications as reasonably and properly come within the scope of our contribution to the art.

We claim:

1. In a mirror mount for a gas laser, said mirror mount containing a mirror receptacle composed of a material having a coefficient of thermal expansion matched to that of a resonator mirror, said mirror receptacle at least partially embracing the resonator mirror and being joined to an end of a tube having a coefficient of thermal expansion differing from that of the mirror receptacle to place the resonator mirror in axial alignment with the tube, the improvements comprising the mirror receptacle having a holding region and a spacer region, said holding region embracing the mirror and said spacer region defining a distance of the mirror from the end of the tube, the mirror receptacle being deformable in a radial direction so that mechanical stresses that can arise between the tube and mirror receptacle as a consequence of temperature fluctuations occurring during manufacturing and during operation of the laser will not produce any damage to the mirror and to the connection between the mirror and mirror receptacle.

2. In a mirror mount according to claim 1, wherein the tube has a higher coefficient of thermal expansion than the mirror receptacle and has an end region overlapping the mirror receptacle in an axial direction, said mirror receptacle pressing against said end region.

3. In a mirror mount according to claim 2, wherein the distance between the end of the tube and the mirror does not fall below 0.5 mm measured in an axial direction of the mirror receptacle, and wherein the tube and mirror receptacle are joined to one another by surface bonding.

4. In a mirror mount according to claim 3, wherein the holding region of the mirror receptacle covers the spacer region in an axial direction.

5. In a mirror mount according to claim 3, wherein the spacer region and holding region of the mirror receptacle adjoin one another in an axial direction.

6. In a mirror mount according to claim 3, wherein the tube is composed of steel and the mirror receptacle is composed of a NiFe alloy having a coefficient of thermal expansion matched to that of the mirror.

7. In a mirror mount according to claim 2, wherein the distance between the end of the tube and the mirror is approximately 1.3 mm and the end region of the tube is soldered to the holding region of the mirror receptacle from the outside.

8. In a mirror mount according to claim 1, wherein the mirror receptacle is composed of a sheet metal ring, said holding region being fashioned as an outer flange ring and the spacer region being fashioned as an inner flange ring, both flange rings being joined to the tube mechanically firmly and vacuum-tight at a distance from the point of contact with the mirror.

9. In a mirror mount according to claim 8, wherein the tube is composed of steel and the mirror receptacle is composed of an NiFe alloy having a coefficient of thermal expansion matched to that of the mirror.

10. In a mirror mount according to claim 8, wherein the tube has a higher coefficient of thermal expansion than the mirror receptacle and has an end region overlapping the mirror receptacle in an axial direction, said mirror receptacle being pressed against said end region.

11. In a mirror mount according to claim 10, wherein the distance between the end of the tube and the mirror amounts to approximately 1.3 mm and the end region of the tube is soldered to the holding region of the mirror receptacle proceeding from the outside.

12. In a mirror mount according to claim 8, wherein the distance between the end of the tube and the mirror does not fall below 0.5 mm measured in an axial direction of the mirror receptacle and that the tube and mirror receptacle are joined to one another by surface soldering.

13. In a mirror mount according to claim 8, wherein the holding region of the mirror receptacle covers the spacer region in an axial direction.

14. In a mirror mount according to claim 8, wherein the spacer region and holding region of the mirror receptacle adjoin one another in an axial direction.

15. In a mirror mount according to claim 1, wherein the tube is composed of steel and the mirror receptacle is composed of an NiFe alloy having a coefficient of thermal expansion matched to the mirror.

16. In a mirror mount according to claim 1, wherein the distance between the first point of contact between the tube and the mirror does not fall below 0.5 mm measured in an axial direction of the mirror receptacle and that the tube and mirror receptacle are joined to one another by surface bonding.

17. In a mirror mount according to claim 1, wherein the holding region of the mirror receptacle covers the spacer region in an axial direction.

18. In a mirror mount according to claim 1, wherein the spacer region and holding region of the mirror receptacle adjoin one another in an axial direction.

19. In a mirror mount according to claim 1, wherein the mirror mount is for an HeNe gas laser.

* * * * *